United States Patent
Chou

(10) Patent No.: US 11,143,159 B2
(45) Date of Patent: Oct. 12, 2021

(54) MAGNUS ROTOR

(71) Applicant: Chung-Chi Chou, Tainan (TW)

(72) Inventor: Chung-Chi Chou, Tainan (TW)

( * ) Notice: Subject to any disclaimer, the term of this patent is extended or adjusted under 35 U.S.C. 154(b) by 0 days.

(21) Appl. No.: 16/869,332

(22) Filed: May 7, 2020

(65) Prior Publication Data

US 2020/0408188 A1 Dec. 31, 2020

(30) Foreign Application Priority Data

Jun. 27, 2019 (TW) .................................. 108122712

(51) Int. Cl.
*F03D 1/06* (2006.01)
*F03D 15/00* (2016.01)

(52) U.S. Cl.
CPC ......... *F03D 1/0616* (2013.01); *F03D 1/0633* (2013.01); *F03D 15/00* (2016.05)

(58) Field of Classification Search
CPC .............................. F03D 1/0616; F03D 3/007
See application file for complete search history.

(56) References Cited

U.S. PATENT DOCUMENTS

| 7,504,740 | B2 * | 3/2009 | Murakami | ............ F03D 1/0616 |
| | | | | 290/55 |
| 8,618,690 | B2 | 12/2013 | Seifert | |
| 8,816,522 | B2 | 8/2014 | Newman | |
| 2010/0038915 | A1 * | 2/2010 | Murakami | .............. F03D 3/007 |
| | | | | 290/55 |
| 2012/0217757 | A1 * | 8/2012 | Aoki | ...................... F03D 1/0616 |
| | | | | 290/55 |
| 2013/0292947 | A1 | 11/2013 | Newman | |

FOREIGN PATENT DOCUMENTS

| CN | 101469666 A | 7/2009 |
| CN | 102661241 A | 9/2012 |
| CN | 102803065 A | 11/2012 |
| CN | 103118935 A | 5/2013 |
| CN | 103153779 A | 6/2013 |
| CN | 102803065 B | 9/2015 |
| CN | 103153779 B | 8/2016 |
| EP | 2075459 A2 | 7/2009 |
| TW | I299769 B | 8/2008 |
| TW | I426036 B | 2/2014 |

* cited by examiner

*Primary Examiner* — Michael Lebentritt
*Assistant Examiner* — Jason G Davis
(74) *Attorney, Agent, or Firm* — Kirton McConkie; Evan R. Witt

(57) ABSTRACT

A Magnus rotor is provided. The Magnus rotor is located in a flowing fluid and driven to rotate by a power source. The Magnus rotor includes a Magnus rotor main body and a blade assembly. The Magnus rotor main body includes a cylinder side wall, a first end and a second end. The first end and the second end are disposed in one end and the other end of the cylinder side wall, respectively. The Magnus rotor is rotated around an axis connected between a first center point of the first end and a second center point of the second end. The blade assembly includes a plurality of blades which are disposed around the first end. Each blade is inclined toward a direction. A gap is formed between each two adjacent blades. Each gap is formed as a flowing channel for allowing the fluid to flow therethrough.

19 Claims, 16 Drawing Sheets

MAGNUS ROTOR

CROSS-REFERENCE TO RELATED APPLICATION

This application claims priority to Taiwan Patent Application No. 108122712 filed on Jun. 27, 2019. The entire contents of the above-mentioned patent application are incorporated herein by reference for all purposes.

FIELD OF THE INVENTION

The present disclosure relates to a rotor, and more particularly to a Magnus rotor.

BACKGROUND OF THE INVENTION

Generally, system which uses fluid kinetic energy to obtain propulsion has a Magnus rotor, such as a wind propulsion system of a ship or a wind turbine. While the Magnus rotor is rotated, the Magnus rotor of the system utilizes Magnus effect to generate propulsion to propel the ship or the wind turbine.

FIG. 1 is a schematic perspective top view illustrating a conventional Magnus rotor. As shown in FIG. 1, the conventional Magnus rotor r has a cylinder structure and is capable of spinning. While the Magnus rotor r is rotated at an angular velocity V1 in clockwise as shown in FIG. 1 and fluid W flows toward the Magnus rotor r at a fluid speed V2, the Magnus rotor r produces lift force F acting on the cylinder structure according to Magnus effect. The lift force F is proportional to the angular velocity V1 of the Magnus rotor r and the fluid speed V2. The direction of the lift force F is perpendicular to both of the direction of the fluid speed V2 and the direction of the rotor axis of the cylinder structure. While the rotation direction of the Magnus rotor r is in counterclockwise, the direction of the lift force F acting on the cylinder structure is opposite to the direction of the lift force F as shown in FIG. 1. For increasing the lift force resulting from the Magnus effect, the conventional Magnus rotor includes two circular sheets (called end plate or end cover) disposed at two opposite ends of the cylinder structure. The diameter of the circular sheet is larger than the diameter of the cylinder structure. However, the increased lift force is not sufficient. In order to address the above-mentioned issues, the conventional Magnus rotor employs a plurality of geometric portions, such as convex blocks or convex strips, disposed on the peripheral wall of the cylinder structure. However, the effect of increasing the lift force is limited, and the drag is increased. Consequently, the lift-drag ratio (i.e. a ratio between lift force and drag, which is a key factor to determine the effect of the Magnus rotor) of the Magnus rotor r is decreased and the efficiency of the Magnus rotor r is poor.

Therefore, there is a need of providing a Magnus rotor which can increase the lift force, reduce the drag and maintain excellent lift-drag ratio, so as to address the issues encountered by the prior arts.

SUMMARY OF THE INVENTION

An object of the present disclosure provides a Magnus rotor with enhanced performance, which is applicable to various applications.

In accordance with an aspect of the present disclosure, a Magnus rotor is provided. The Magnus rotor is located in a flowing fluid. The fluid is air or liquid. The Magnus rotor is driven to rotate by a power source. The Magnus rotor includes a Magnus rotor main body and a first blade assembly. The Magnus rotor main body includes a cylinder side wall, a first end and a second end. The first end is disposed in one end of the cylinder side wall. The second end is disposed in the other end of the cylinder side wall and opposite to the first end. A connection line between a first center point of the first end and a second center point of the second end is formed as an axis. The Magnus rotor is rotated around the axis. The first blade assembly includes a plurality of first blades. The plurality of first blades are disposed around the first end and adjacent to the first end. Each first blade is inclined toward a first direction. A first gap is formed between each two adjacent first blades. Each first gap is formed as a first flowing channel for allowing the fluid to flow therethrough.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
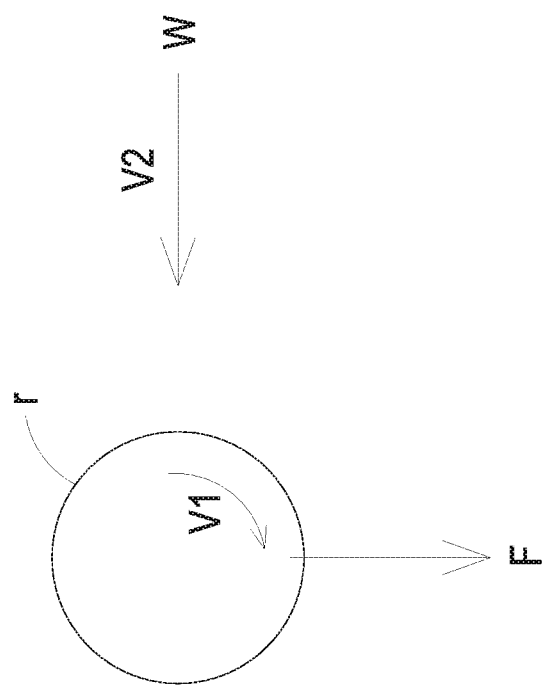
FIG. 1 is a schematic perspective top view illustrating a conventional Magnus rotor.
Figure 2:
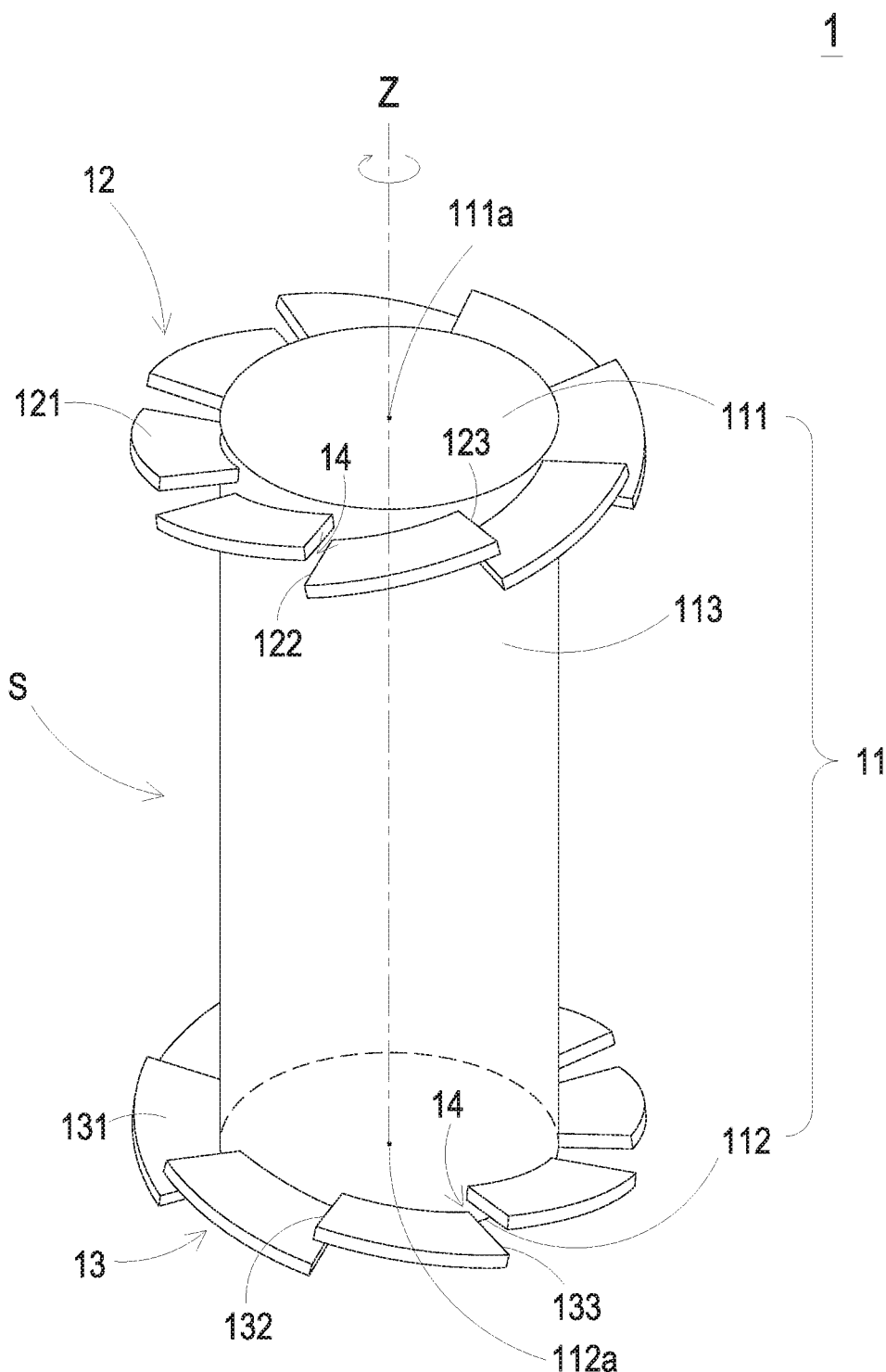
FIG. 2 is a schematic perspective view illustrating a Magnus rotor according to a first embodiment of the present disclosure, wherein a leading edge of a blade of the Magnus rotor is inclined in one direction.
Figure 3:
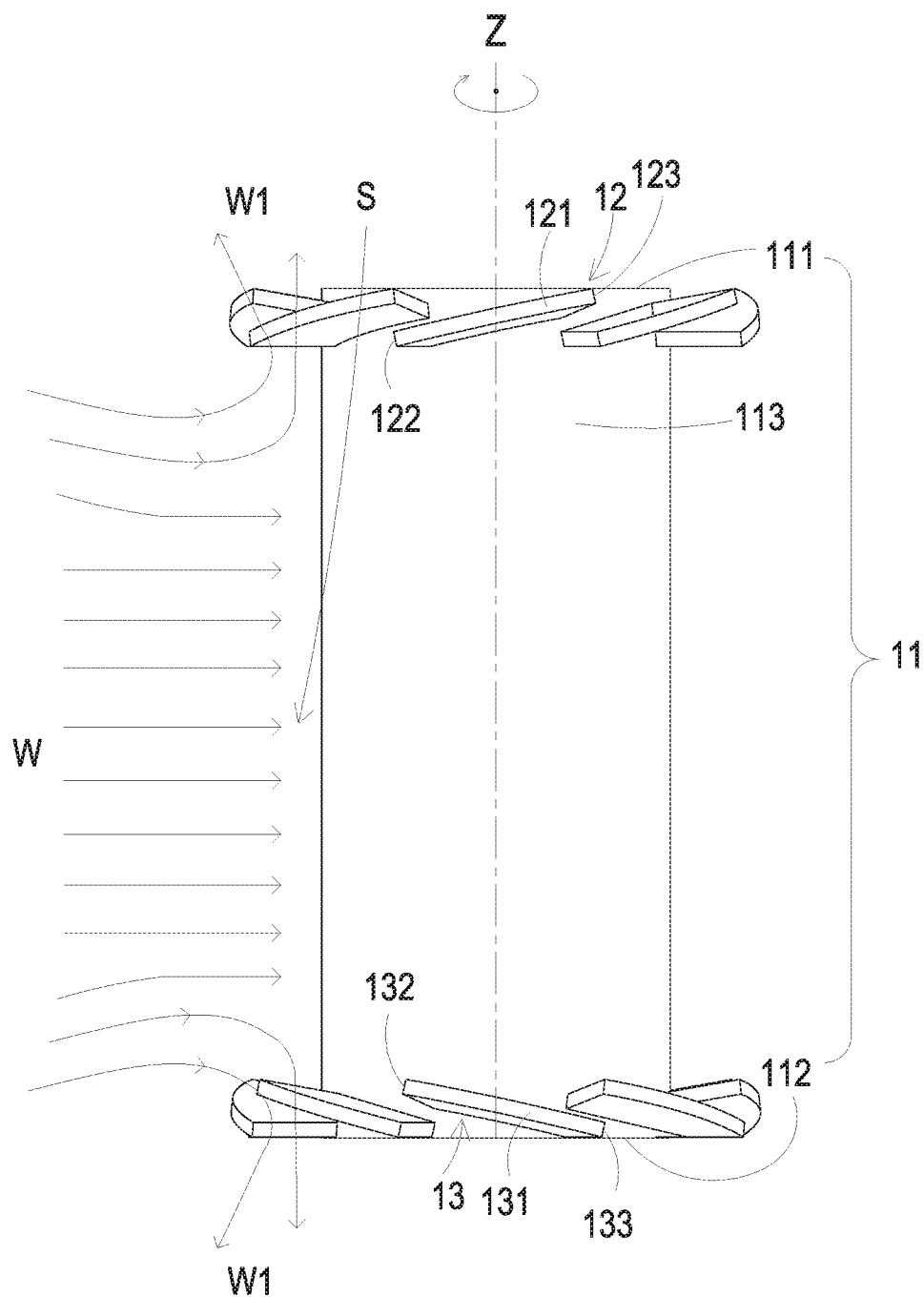
FIG. 3 is a schematic perspective side view illustrating the Magnus rotor of FIG. 2.
Figure 4:
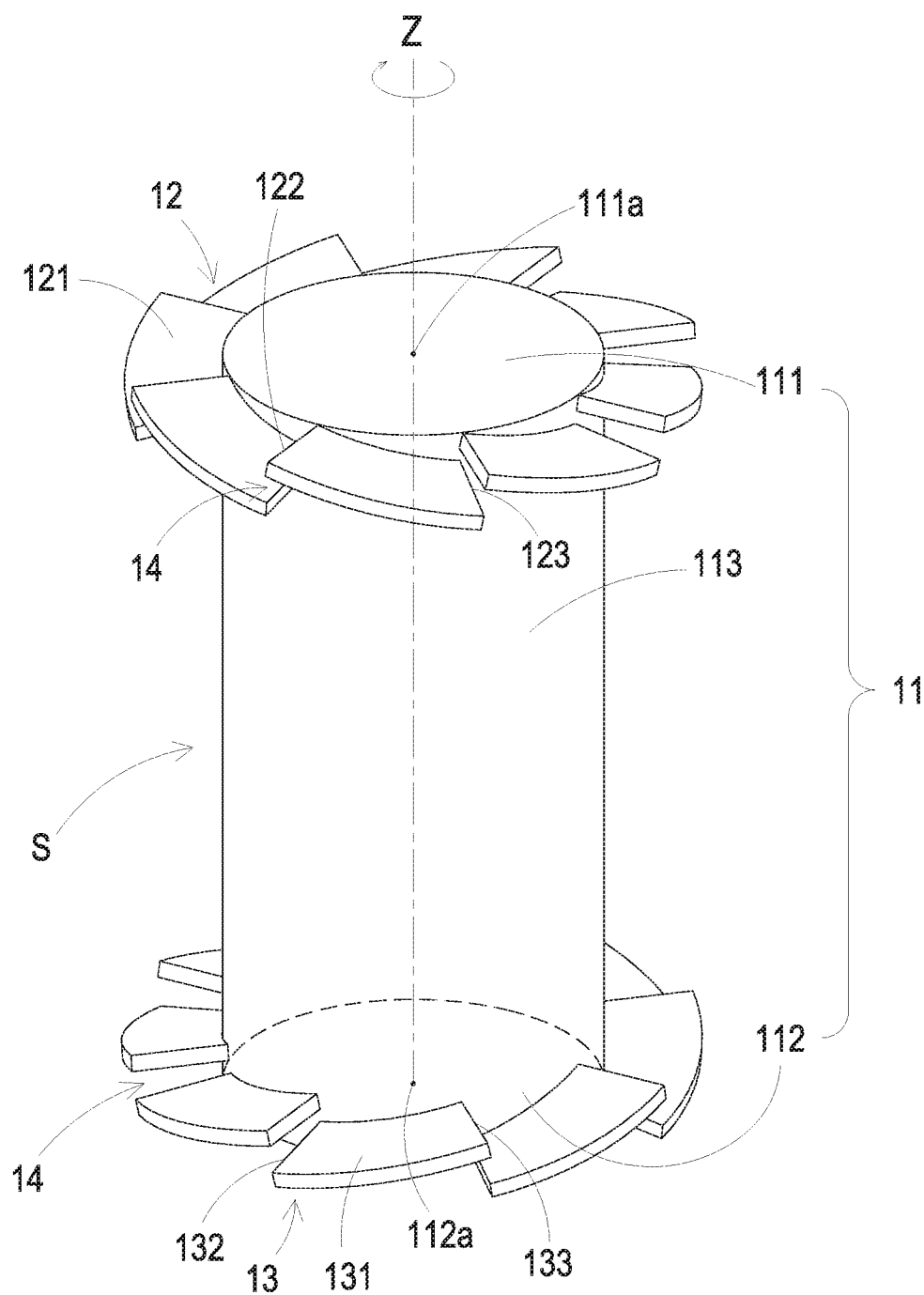
FIG. 4 is a schematic perspective view illustrating the Magnus rotor according to the first embodiment of the present disclosure, wherein the leading edge of the blade of the Magnus rotor is inclined in another direction.
Figure 5:
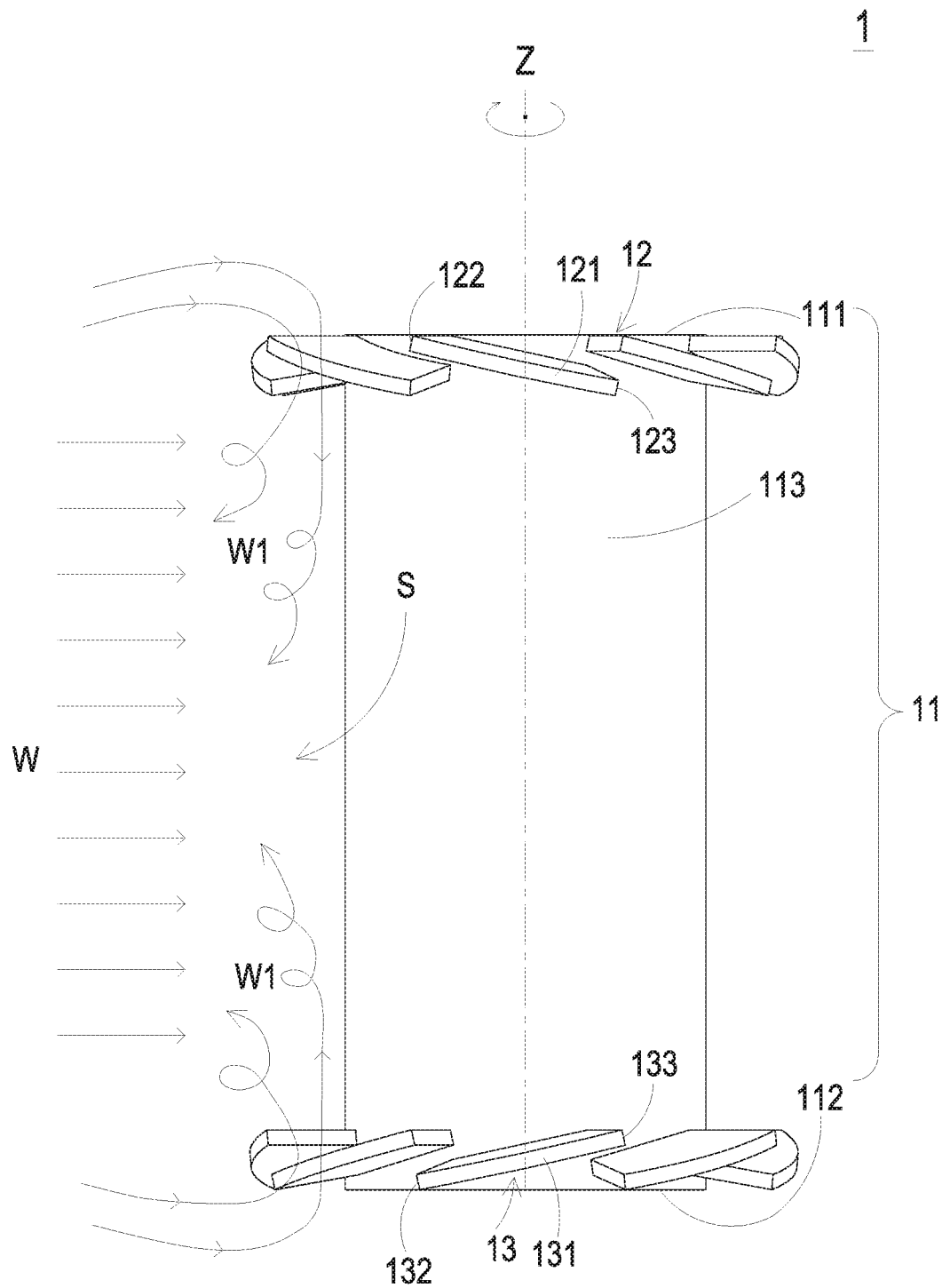
FIG. 5 is a schematic perspective side view illustrating the Magnus rotor of FIG. 4.

FIG. 2 is a schematic perspective view illustrating a Magnus rotor according to a first embodiment of the present disclosure, wherein a leading edge of a blade of the Magnus rotor is inclined in one direction. FIG. 3 is a schematic perspective side view illustrating the Magnus rotor of FIG. 2. FIG. 4 is a schematic perspective view illustrating the Magnus rotor according to the first embodiment of the present disclosure, wherein the leading edge of the blade of the Magnus rotor is inclined in another direction. FIG. 5 is a schematic perspective side view illustrating the Magnus rotor of FIG. 4. As shown in FIGS. 2 to 5, the Magnus rotor 1 of the present disclosure is rotated in a rotation direction. In some embodiments, the Magnus rotor 1 is connected to a power source (not shown in the figures), such as a motor or an engine, so that the Magnus rotor 1 is driven to rotate by the power source. In this embodiment, the Magnus rotor 1 is located in flowing fluid W. While the Magnus rotor 1 is rotated, the Magnus rotor 1 produces lift force according to the Magnus effect. The Magnus rotor 1 includes a Magnus rotor main body 11 and a first blade assembly 12. The Magnus rotor main body 11 includes a first end 111, a second end 112 and a cylinder side wall 113. The first end 111 is located in one end of the cylinder side wall 113 and has a first center point 111a. The second end 112 is located in the other end of the cylinder side wall 113 and opposite to the first end 111. The second end 112 has a second center point 112a. A line connected between the second center point 112a of the second end 112 and the first center point 111a of the first end 111 is formed as an axis Z. The Magnus rotor 1 is rotated around the axis Z. Moreover, the cylinder side wall 113, the first end 111 and the second end 112 are collaboratively formed as a cylinder structure.

The first blade assembly 12 is adjacent to the first end 111 and includes a plurality of first blades 121. In this embodiment, the plurality of first blades 121 are disposed around the cylinder side wall 113 and spaced apart from each other evenly. Each first blade 121 includes a leading edge 122 and a trailing edge 123. The leading edge 122 is located on a leading side of the corresponding first blade 121 according to the rotation direction of the Magnus rotor 1. The trailing edge 123 is located on a trailing side of the corresponding first blade 121 according to the rotation direction of the Magnus rotor 1. In other words, in case that the rotation direction of the Magnus rotor 1 is opposite to the rotation direction of the Magnus rotor 1 of FIG. 2, position of the leading edge 122 of the first blade 121 and position of the trailing edge 123 of the first blade 121 are changed with each other. As shown in FIGS. 2 and 3, the leading edge 122 of the first blade 121 is inclined toward the second end 112 with respect to the trailing edge 123 of the first blade 121. A gap 14 is formed between each two adjacent first blades 121. In other words, the gap 14 is formed between the leading edge 122 of each first blade 121 and the trailing edge 123 of the adjacent first blade 121. In some other embodiments, as shown in FIGS. 4 and 5, the leading edge 122 of the first blade 121 is inclined away from the second end 112 with respect to the trailing edge 123 of the first blade 121. A gap 14 is formed between each two adjacent first blades 121. In other words, the gap 14 is formed between the trailing edge 123 of each first blade 121 and the leading edge 122 of the adjacent first blade 121. In some embodiments, the area of each first blade 121 is smaller than the area of the first blade 121 of FIG. 2, as shown in FIG. 6B. Under this circumstance, even if the leading edge 122 and the trailing edge 123 of each first blade 121 are close to the horizontal state (i.e. the inclination angle of each first blade 121 is small), the gap 14 is still formed between the leading edge 122 of each first blade 121 and the trailing edge 123 of the adjacent first blade 121 and has sufficient space to form a flowing channel for allowing the fluid W to flow therethrough.

In some embodiments, the Magnus rotor 1 further includes a second blade assembly 13. The second blade assembly 13 is adjacent to the second end 112 and includes a plurality of second blades 131. In this embodiment, the plurality of second blades 131 are disposed around the cylinder side wall 113 and spaced apart from each other evenly. Each second blade 131 includes a leading edge 132 and a trailing edge 133. The leading edge 132 is located on a leading side of the corresponding second blade 131 according to the rotation direction of the Magnus rotor 1. The trailing edge 133 is located on a trailing side of the corresponding second blade 131 according to the rotation direction of the Magnus rotor 1. In other words, in case that the rotation direction of the Magnus rotor 1 is opposite to the rotation direction of the Magnus rotor 1 of FIG. 2, position of the leading edge 132 of the second blade 131 and position of the trailing edge 133 of the second blade 131 are changed with each other. As shown in FIGS. 2 and 3, the leading edge 132 of the second blade 131 is inclined toward the first end 111 with respect to the trailing edge 133 of the second blade 131. A gap 14 is formed between each two adjacent second blades 131. In other words, the gap 14 is formed between the trailing edge 133 of each second blade 131 and the leading edge 132 of the adjacent second blade 131. In some other embodiments, as shown in FIGS. 4 and 5, the leading edge 132 of the second blade 131 is inclined away from the first end 111 with respect to the trailing edge 133 of the second blade 131. A gap 14 is formed between each two adjacent second blades 131. A gap 14 is formed between the trailing edge 133 of each second blade 131 and the leading edge 132 of the adjacent second blade 131. In some embodiments, the area of each second blade 131 is smaller than the area of the second blade 131 shown in FIG. 2. Under this circumstance, even if the leading edge 132 and the trailing edge 133 of each second blade 131 are close to the horizontal state (i.e. the inclination angle of each second blade 131 is small), the gap 14 is still formed between the leading edge 132 of each second blade 131 and the trailing edge 133 of the adjacent second blade 131 and has sufficient space to form a flowing channel for allowing the fluid W to flow therethrough.

Please refer to FIGS. 2 and 3 again. While the Magnus rotor 1 is rotated around the axis Z in a first rotation direction, such as clockwise, the leading edge 122 of each first blade 121 is inclined toward the second end 112 with respect to the trailing edge 123 of the first blade 121, the trailing edge 123 of each first blade 121 is inclined away from the second end 112 with respect to the leading edge 122 of the first blade 121, the leading edge 132 of each second blade 131 is inclined toward the first end 111 with respect to the trailing edge 133 of the second blade 131, and the trailing edge 133 of each second blade 131 is inclined away from the first end 111 with respect to the leading edge 132 of the second blade 131. According to the rotation direction of the Magnus rotor 1 and the inclination angle of the first blade 121 and the second blade 131, portion of the fluid W adjacent to a surface space S of the cylinder side wall 113 flows and is exhausted through the gap 14 of the first blade 121 and the gap 14 of the second blade 131. The portion of the fluid W is exhausted away from the first end 111 and the second end 112 of the Magnus rotor 1, as shown by the flowing line of the fluid W1 of FIG. 3. Therefore, the surface space S of the cylinder side wall 113 forms a low pressure area compared with the surrounding environment of the Magnus rotor 1. Consequently, more fluid W is inhaled to the surface space S adjacent to the cylinder side wall 113 of the Magnus rotor 1. So that, the Magnus effect is increased, and the lift force is increased. The low pressure area adjacent to the surface space S of the cylinder side wall 113 also reduces the drag of the Magnus rotor 1 facing the fluid W. Consequently, the lift-drag ratio of the Magnus rotor 1 is increased, and the practicality of the Magnus rotor 1 is enhanced.

Please refer to FIGS. 4 and 5. While the Magnus rotor 1 is rotated around the axis Z in the first rotation direction, such as clockwise, the leading edge 122 of each first blade 121 is inclined away from the second end 112 with respect to the trailing edge 123 of the first blade 121, the trailing edge 123 of each first blade 121 is inclined toward the second end 112 with respect to the leading edge 122 of the first blade 121, the leading edge 132 of each second blade 131 is inclined away from the first end 111 with respect to the trailing edge 133 of the second blade 131, and the trailing edge 133 of each second blade 131 is inclined toward the first end 111 with respect to the leading edge 132 of the second blade 131.

According to the rotation direction of the Magnus rotor 1 and the inclination angle of the first blade 121 and the second blade 131, portion of the fluid (W1) located outside and adjacent to the first end 111 and the second end 112 of the Magnus rotor 1 flows to the surface space S adjacent to the cylinder side wall 113 through the gap 14 of the first blade 121 and the gap 14 of the second blade 131, as shown by the flowing line of the fluid W1. The portion of the fluid (W1) flowing through the gap 14 of the first blade 121 and the gap 14 of the second blade 131 is conflicted with the portion of the fluid W flowing to the surface space S adjacent to the cylinder side wall 113, so that turbulence is formed. Consequently, circulation of the fluid is restrained, and the lift force resulting from the Magnus effect is reduced.

From above, while the rotation direction of the Magnus rotor 1 is unchanged, changing the inclination direction of the first blade 121 and the inclination direction of the second blade 131 causes different effects for increasing the lift force or reducing the lift force resulting from the Magnus effect. Similarly, while the inclination angle of the first blade 121 and the inclination angle of the second blade 131 are unchanged, changing the rotation direction of the Magnus rotor 1 also causes different effects for increasing the lift force or reducing the lift force. Consequently, while the inclination angle of the first blade 121 and the inclination angle of the second blade 131 are set to exhaust portion of the fluid W from the surface space S adjacent to the cylinder side wall 113 through the gap 14 and away from the first end 111 and the second end 112, the lift force is increased. Otherwise, while the inclination angle of the first blade 121 and the inclination angle of the second blade 131 are set to inhale portion of the fluid W from outside to the surface space S adjacent to the cylinder side wall 113, the lift force is reduced.

In practice, in case that the rotation direction of the Magnus rotor 1 is in an unitary direction, the inclination angle of the first blade 121 and the inclination angle of the second blade 131 are maintained for increasing the lift force. Alternatively, in case that the rotation direction of the Magnus rotor 1 needed to be changed, the inclination angle of the first blade 121 and the inclination angle of the second blade 131 must be changed dynamically. Consequently, no matter the rotation direction of the Magnus rotor 1 is in the first rotation direction (i.e. clockwise) or a second rotation direction (i.e. counterclockwise), the inclination angle of the first blade 121 and the inclination angle of the second blade 131 both can be adjusted to allow portion of the fluid W to be exhausted from the surface space S adjacent to the cylinder side wall 113 through the gap 14 and away from the first end 111 and the second end 112 for the lift force of the Magnus rotor 1 is increased. In some embodiments, the Magnus rotor 1 is applicable to a wind turbine. The inclination angle of the first blade 121 and the inclination angle of the second blade 131 are adjusted for reducing the lift force in order to prevent the rotation speed of the wind turbine exceeds a threshold value from malfunction under extremely strong wind.

Figure 6A:
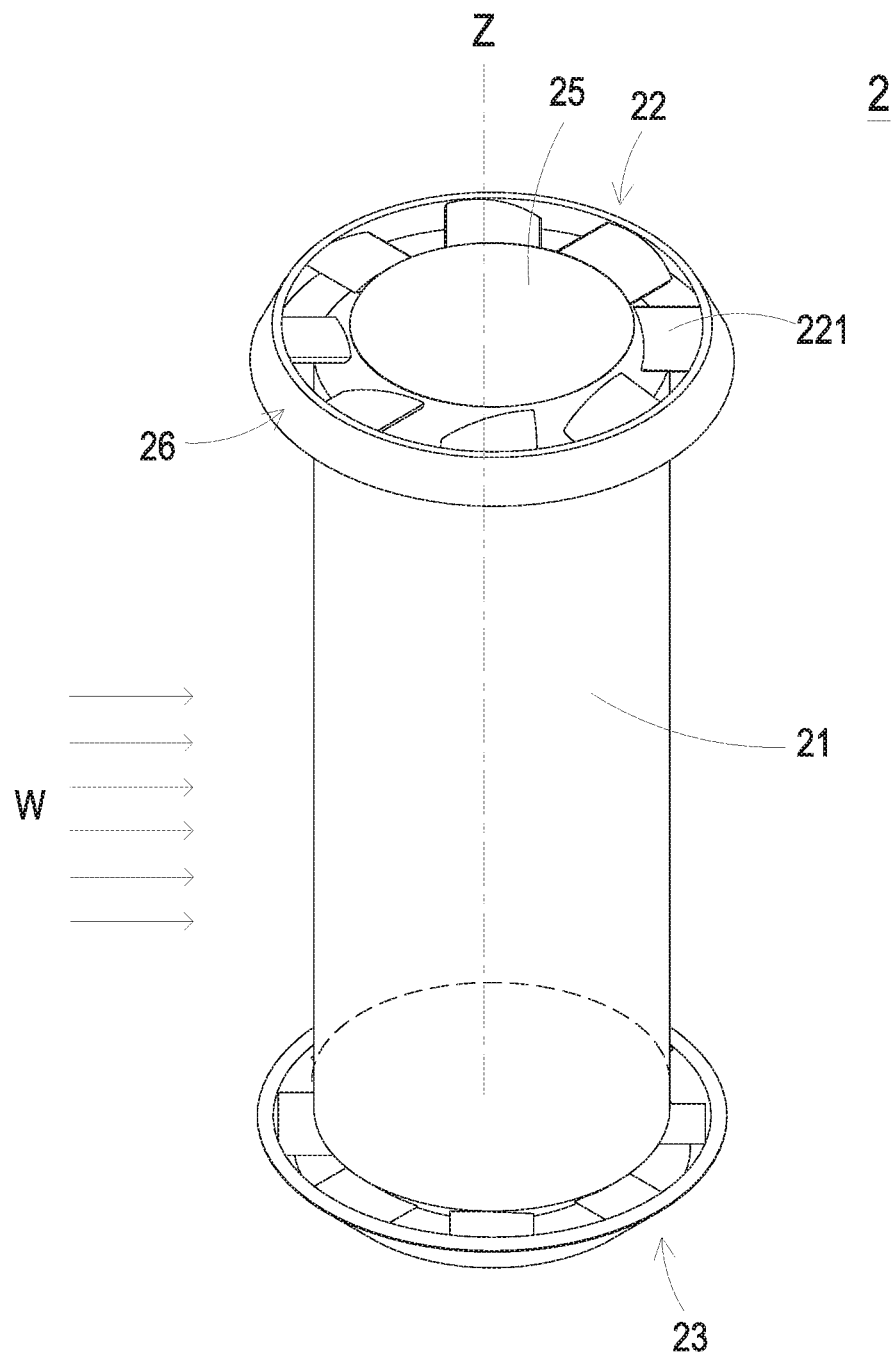
FIG. 6A is a schematic perspective view illustrating a Magnus rotor according to a second embodiment of the present disclosure.
Figure 6B:
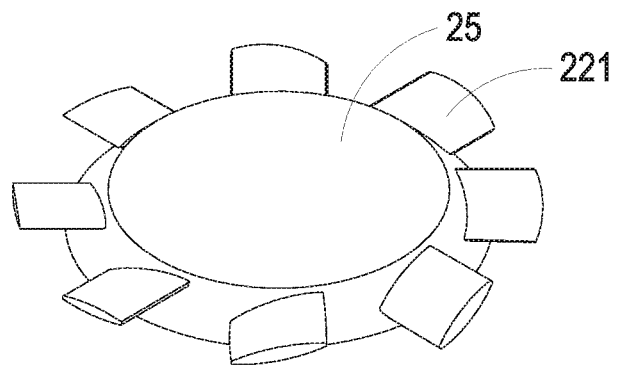
FIG. 6B is a schematic perspective view illustrating a blade and a blade main body of the Magnus rotor of FIG. 6A.
Figure 6C:
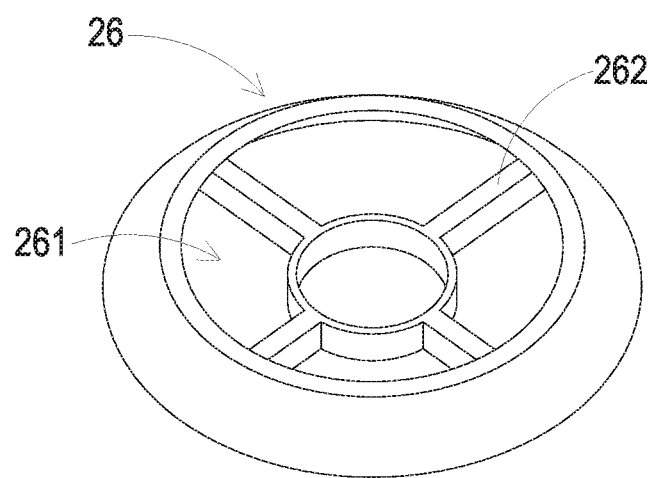
FIG. 6C is a schematic perspective view illustrating a fairing of the Magnus rotor of FIG. 6A.

FIG. 6A is a schematic perspective view illustrating a Magnus rotor according to a second embodiment of the present disclosure. FIG. 6B is a schematic perspective view illustrating a blade and a blade main body of the Magnus rotor of FIG. 6A. FIG. 6C is a schematic perspective view illustrating a fairing of the Magnus rotor of FIG. 6A. As shown in FIGS. 6A to 6C, the Magnus rotor 2 of this embodiment includes a Magnus rotor main body 21, a first blade assembly 22 and a second blade assembly 23. The structures and functions of the Magnus rotor main body 21, the first blade assembly 22 and the second blade assembly 23 of the Magnus rotor 2 of this embodiment are similar to the Magnus rotor main body 11, the first blade assembly 12 and the second blade assembly 13 of the Magnus rotor 1 of FIG. 2. Component parts and elements corresponding to those of the first embodiment are designated by identical numeral references, and detailed descriptions thereof are omitted. Compared with the first embodiment of FIG. 2, two ends of the Magnus rotor main body 21 of this embodiment include respective install portions 25. The first blade assembly 22 and the second blade assembly 23 include respective fairings 26. Each blade of the first blade assembly 22 and the second blade assembly 23 has curved structure or streamlined structure for increasing efficiency.

The plurality of first blades 221 are disposed around and adjacent to the corresponding install portion 25 and spaced apart from each other evenly. The fairing 26 of the first blade assembly 22 is disposed on the first end of the Magnus rotor main body 21 and disposed around the plurality of first blades 221 for reducing the rotation drag of the first blade assembly 22 and reducing the drag of the Magnus rotor 2 facing the fluid W. The outer surface of the fairing 26 has an inclined plane for reducing the drag of the fluid W. In this embodiment, the fairing 26 has a ring-shaped structure. In some embodiments, the fairing 26 has an arc-shaped structure (i.e. the fairing 26 is not completely circumference structure). For example, the fairing 26 is a semicircle structure for surrounding the blade located in upstream location, but not surrounding the blade located in downstream location. Each fairing 26 includes an opening 261 and a plurality of supporting portions 262. The opening 261 is a channel for passing through the fluid W when the plurality of first blades 221 and the corresponding install portion 25 are rotated around the axis Z. The center of the plurality of supporting portions 262 is fixed with the axis Z adjacent to the install portion 25 through a bearing (not shown in figure) for supporting the fairing 26. Similarly, the plurality of second blades are disposed around the corresponding install portion and spaced apart from each other evenly. The fairing of the second blade assembly 23 includes an opening and a plurality of supporting portions. The structures and functions of the opening and the plurality of supporting portions of the second blade assembly 23 are similar to that of the opening 261 and the plurality of supporting portions 262 of the first blade assembly 22, and are not redundantly described herein.

Figure 7A:
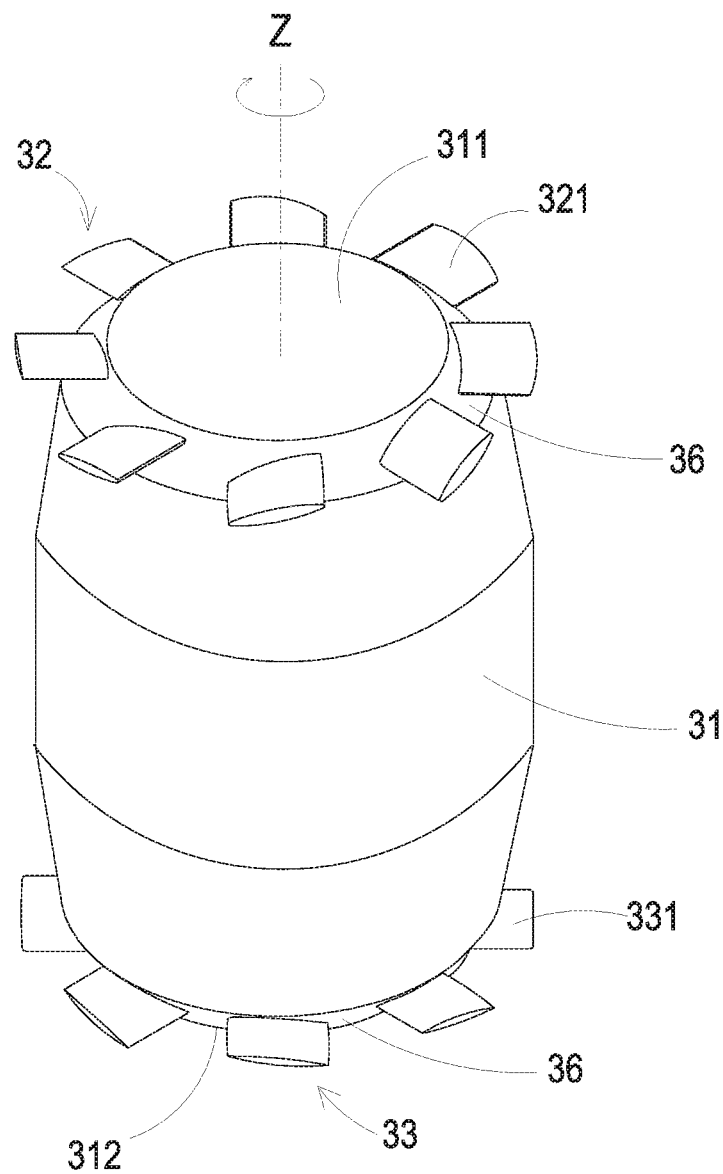
FIG. 7A is a schematic perspective view illustrating a Magnus rotor according to a third embodiment of the present disclosure.
Figure 7B:
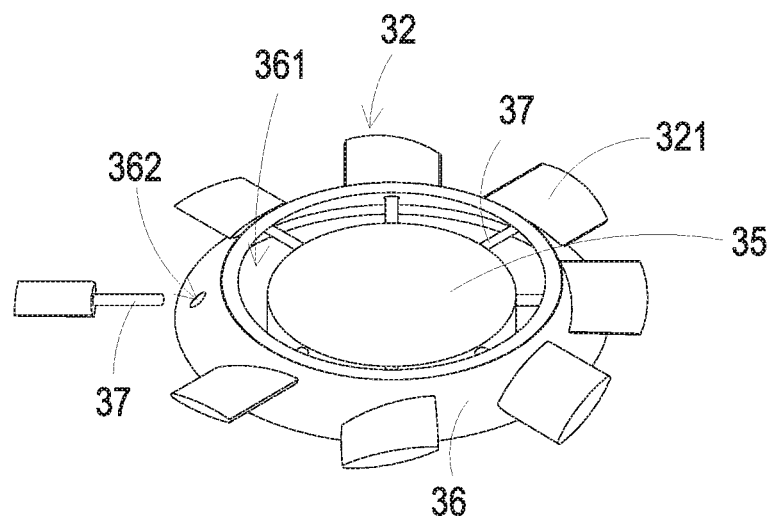
FIG. 7B is a schematic perspective view illustrating a first embodiment of an install portion of the Magnus rotor of FIG. 7A.

FIG. 7A is a schematic perspective view illustrating a Magnus rotor according to a third embodiment of the present disclosure. FIG. 7B is a schematic perspective view illustrating a first embodiment of an install portion of the Magnus rotor of FIG. 7A. As shown in FIGS. 7A to 7B, the Magnus rotor 3 of this embodiment includes a Magnus rotor main body 31, a first blade assembly 32 and a second blade assembly 33. The structures and functions of the Magnus rotor main body 31, the first blade assembly 32 and the second blade assembly 33 of the Magnus rotor 3 are similar to the Magnus rotor main body 11, the first blade assembly 12 and the second blade assembly 13 of the Magnus rotor 1 of FIG. 2. Component parts and elements corresponding to those of the first embodiment are designated by identical numeral references, and detailed descriptions thereof are omitted. Compared with the first embodiment of FIG. 2, the two ends of the Magnus rotor main body 31 include respective install portions 35 and respective fixing portions 36. The first blade assembly 32 and the second blade assembly 33 include a plurality of connection portions 37, respectively. In some embodiments, the surface of the Magnus rotor main body 31 has an inclined plane which is conical for reducing the drag.

The two fixing portions 36 are disposed on the first end 311 and the second end 312 of the Magnus rotor main body 31 respectively, as shown in FIG. 7A. Each fixing portion 36 has a hollow structure and includes an internal space 361 and a plurality of circular holes 362. The internal space 361 is used to accommodate the install portion 35 and the plurality of connection portions 37 which are adjacent to the corresponding fixing portion 36. Each connection portion 37 of the first blade assembly 32 is cylinder structure and passes through the corresponding circular hole 362. Consequently, each connection portion 37 is rotated around the center axis of the corresponding circular hole 362. One end of each connection portion 37 is connected with the corresponding install portion 35. The other end of each connection portion 37 is connected with the corresponding first blade 321. The install portion 35 changes the inclination angle of each first blade 321 by controlling the rotation angle of each connection portion 37 which is connected with the corresponding first blade 321. The first blade assembly 32 is fixed on the Magnus rotor main body 31 through the corresponding fixing portion 36. Consequently, the rotation direction of the first blade assembly 32 rotated around the axis Z is the same with the rotation direction of the Magnus rotor main body 31. Therefore, in arbitrary rotation direction of the first blade 321 (i.e. in arbitrary rotation direction of the Magnus rotor main body 31), the first blade assembly 32 causes the increasing of the Magnus lift force or reducing of the Magnus lift force can be achieved by the aforementioned method of changing the inclination angle of the first blade 321. Similarly, the second blade assembly 33 also includes a plurality of connection portions. The structures and the functions of the plurality of connection portions of the second blade assembly 33 are similar to that of the plurality of connection portions 37 of the first blade assembly 32, and are not redundantly described herein.

In some embodiments, the install portion includes but not limited to gear, gear ring, motor, spring, link, slide wheel and bearing.

Figure 7C:
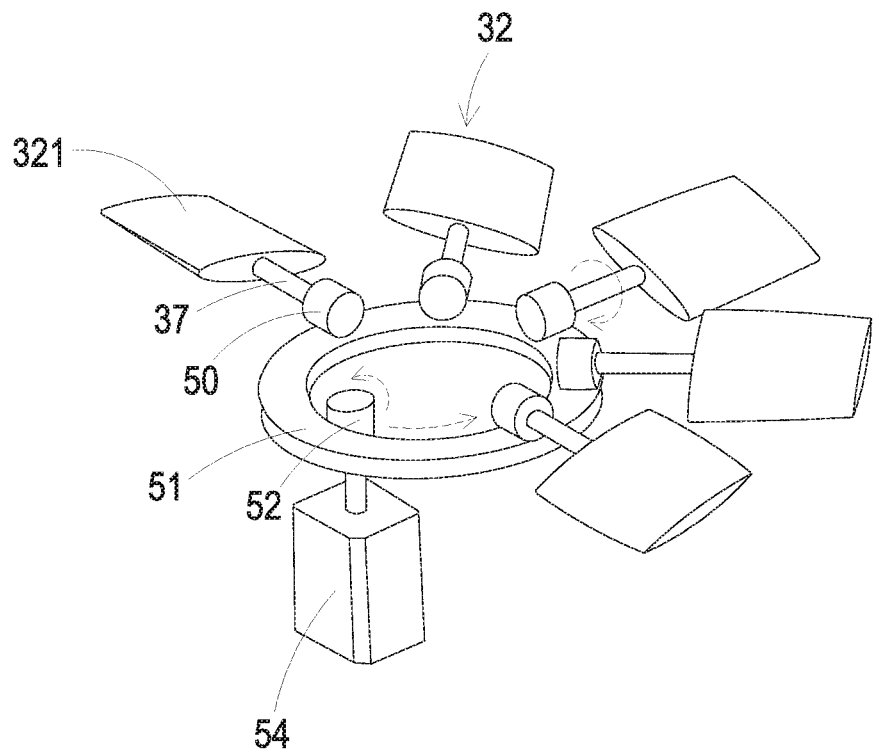
FIG. 7C is a schematic perspective view illustrating a second embodiment of an install portion of the Magnus rotor of FIG. 7A.

FIG. 7C is a schematic perspective view illustrating a second embodiment of an install portion of the Magnus rotor of FIG. 7A. As shown in FIGS. 7A and 7C, in this embodiment, the install portion 35 of the first blade assembly 32 includes a plurality of driven gears 50, a gear ring 51, a driving gear 52 and a driving device 54. For showing the install portion 35 clearly, the fixing portion 36 is omitted in FIG. 7C. The plurality of driven gears 50 are disposed around the gear ring 51. In FIG. 7C, only portion of the plurality of driven gears 50 are shown, but it is obvious that the plurality of driven gears 50 are disposed around the gear ring 51 completely. Each driven gear 50 is connected to the corresponding connection portion 37 and is engaged with the gear ring 51. The gear ring 51 is rotated to drive the driven gear 50 to rotate, so that the connection portion 37 is rotated accordingly. The connection portion 37 is a cylinder structure and passes through the circular hole 362 of the fixing portion 36. While the connection portion 37 is rotated around the center axis of the corresponding circular hole 362, the inclination angle of the first blade 321 connected with the connection portion 37 is changed. The driving gear 52 is engaged with the gear ring 51. The driving gear 52 is rotated to drive the gear ring 51 to rotate. The driving device 54 is but not limited to a motor. The driving device 54 is connected with the driving gear 52. When the inclination angle of the first blade 321 needs to be changed, the driving device 54 drives the driving gear 52 to rotate. In this embodiment, the rotation direction of the driving gear 52, the gear ring 51 and the driven gears 50 are shown by the dotted line of FIG. 7C or opposite. In some embodiments, the driving device 54 includes a transmission device or a reducer. Similarly, the install portion of the second blade assembly 33 includes a plurality of driven gears, a gear ring, a driving gear and a driving device. The structures and the functions of the plurality of driven gears, the gear ring, the driving gear and the driving device of the second blade assembly 33 are similar to that of the plurality of driven gears 50, the gear ring 51, the driving gear 52 and the driving device 54 of the first blade assembly 32, and are not redundantly described herein.

Figure 7D:
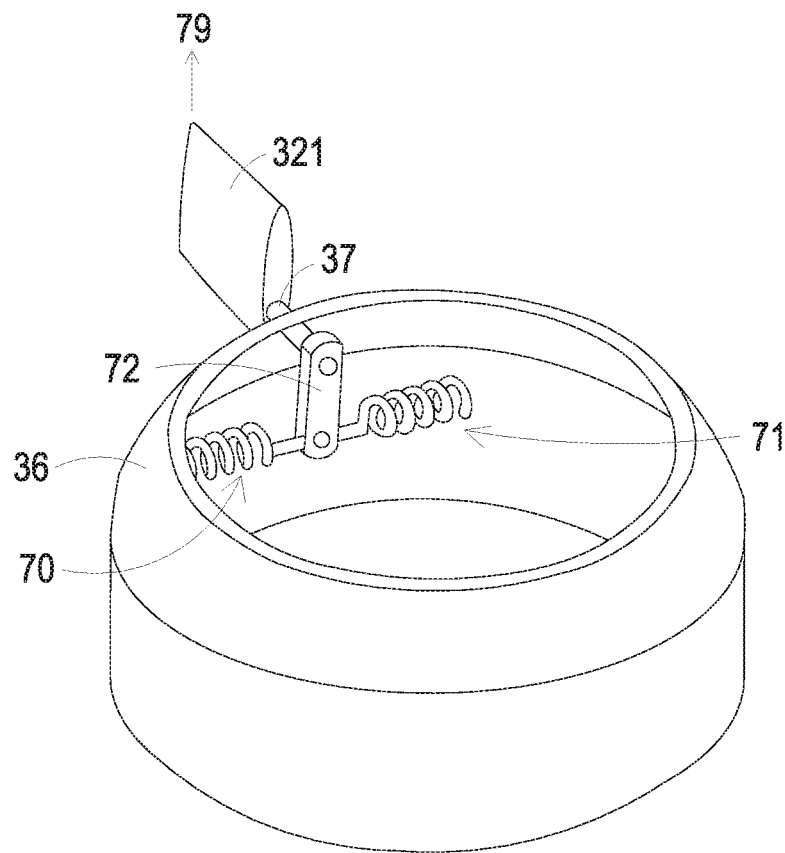
FIG. 7D is a schematic perspective view illustrating a third embodiment of an install portion of the Magnus rotor of FIG. 7A.
Figure 7E:
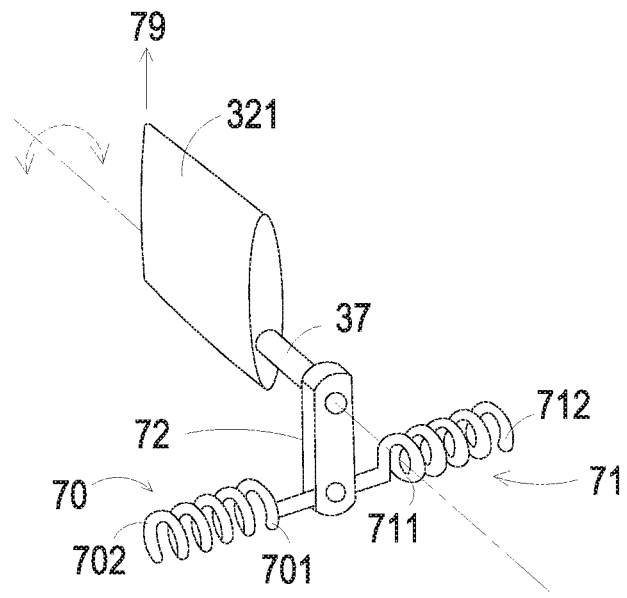
FIG. 7E is a schematic perspective view illustrating a first blade, a connection portion and a connection device of FIG. 7D.

FIG. 7D is a schematic perspective view illustrating a third embodiment of an install portion of the Magnus rotor of FIG. 7A. FIG. 7E is a schematic perspective view illustrating a first blade, a connection portion and a connection device of FIG. 7D. As shown in FIGS. 7A, 7D and 7E, in this embodiment, the install portion 35 of the first blade assembly 32 includes a plurality of connection devices. Each connection device includes a first spring 70, a second spring 71 and a link 72. For showing the connection device clearly, only one connection device is shown. However, it is obvious that the install portion 35 of the first blade assembly 32 includes a plurality of connection devices, and portion of the fixing portion 36 is omitted for allowing the install portion 35 to be shown clearly. The first blade 321 is fixedly connected with the connection portion 37 to form a rigid body structure. One end of the link 72 is connected with the corresponding connection portion 37. The other end of the link 72 is connected with a first end 701 of the first spring 70 and a first end 711 of the second spring 71. A second end 702 of the first spring 70 and a second end 712 of the second spring 71 are fixed in the fixing portion 36. In this embodiment, when the fluid W is stationary and the first spring 70 is balanced with the second spring 71, a chord line 79 of each first blade 321 is parallel to the axis Z. Moreover, when the first blade 321 is inclined by the drag force of the fluid W and the first blade 321 is inclined as the dotted line of FIG. 7E, the first blade 321 drives the connection portion 37 to rotate. The connection portion 37 drives the link 72 to rotate. Hence, the first spring 70 and the second spring 71 undergo deformation to produce recovery force. When the recovery force of the first spring 70 and the recovery force of the second spring 71 increase until the value balanced with the drag causing by the fluid W acting on the first blade 321, the inclination angle of the first blade 321 is not changed anymore. Moreover, for avoiding the inclination angle of the first blade 321 become too large, the springs with less deformation are employed for the first spring 70 and the second spring 71. In some embodiments, the fixing portion 36 includes a stopper (not shown in figure) for limiting the inclination angle of the first blade 321. Similarly, the install portion of the second blade assembly 33 includes a plurality of connection devices. The structures and functions of the plurality of the connection devices of the install portion of the second blade assembly 33 are similar to that of the plurality of the connection devices of the install portion 35 of the first blade assembly 32, and are not redundantly described herein.

Figure 7F:
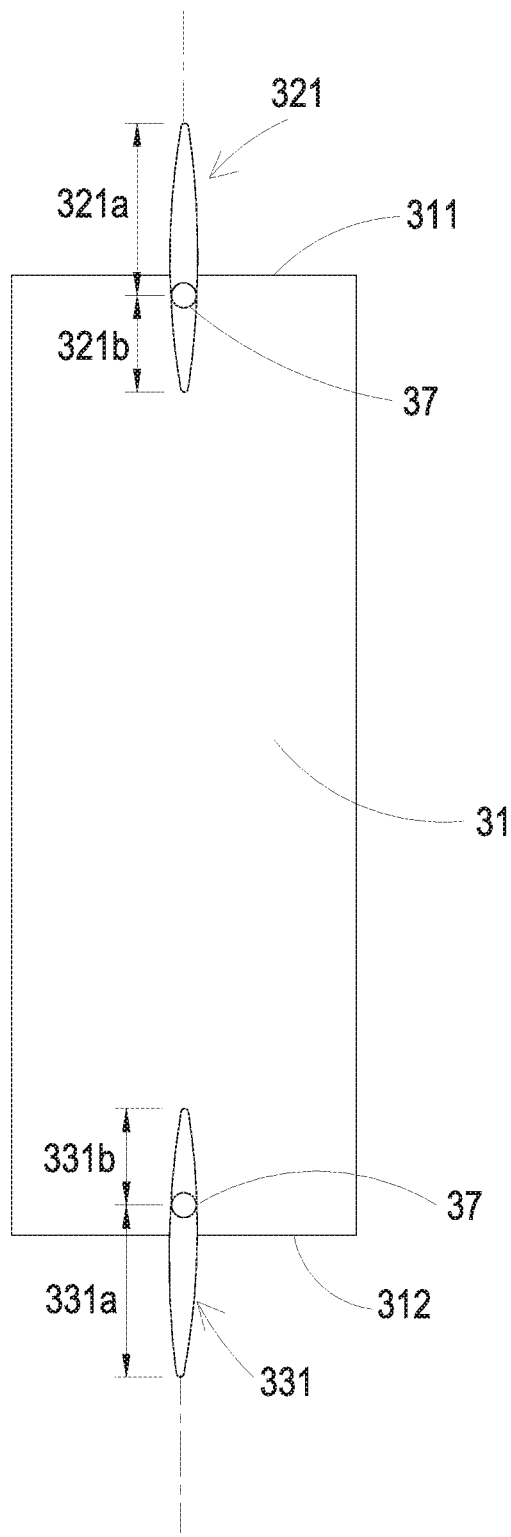
FIG. 7F is a schematic perspective side view illustrating the Magnus rotor of FIGS. 7D and 7I, wherein chord lines of the first blade and the second blade are parallel to the axis when the Magnus rotor is stopped.
Figure 7G:
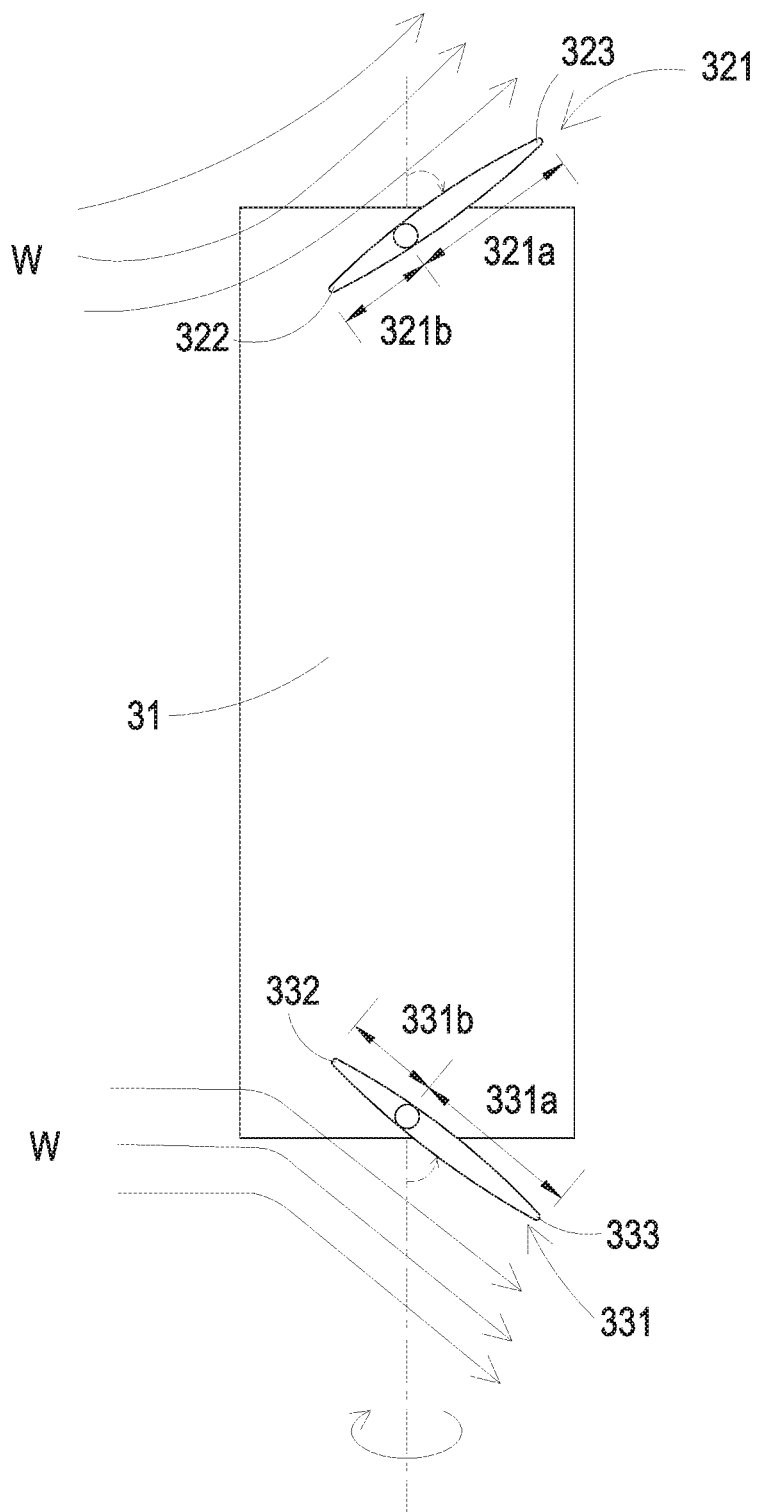
FIG. 7G is a schematic perspective side view illustrating the Magnus rotor of FIGS. 7D and 7I, wherein chord lines of the first blade and the second blade are inclined with respect to the axis when the Magnus rotor is rotated in clockwise.
Figure 7H:
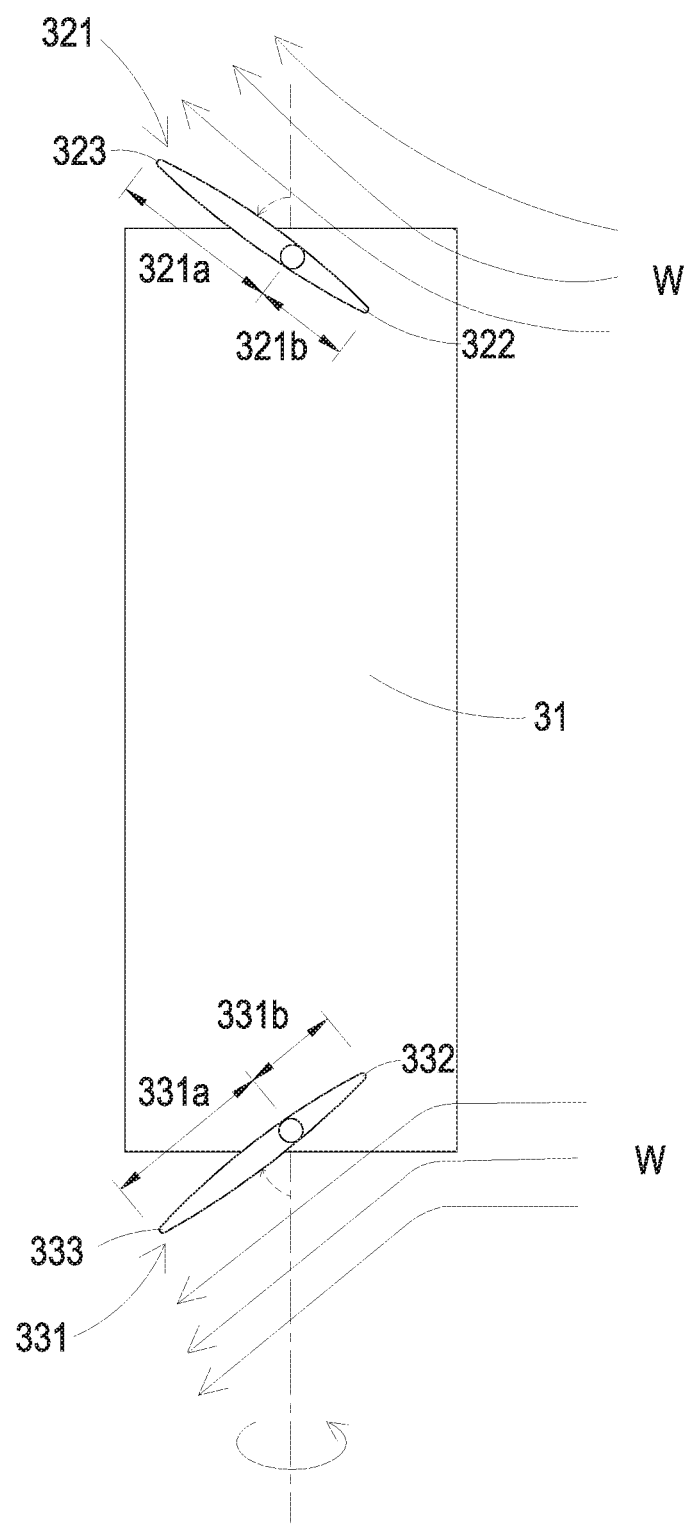
FIG. 7H is a schematic perspective side view illustrating the Magnus rotor of FIGS. 7D and 7I, wherein chord lines of the first blade and the second blade are inclined with respect to the axis when the Magnus rotor is rotated in counterclockwise.
Figure 7I:
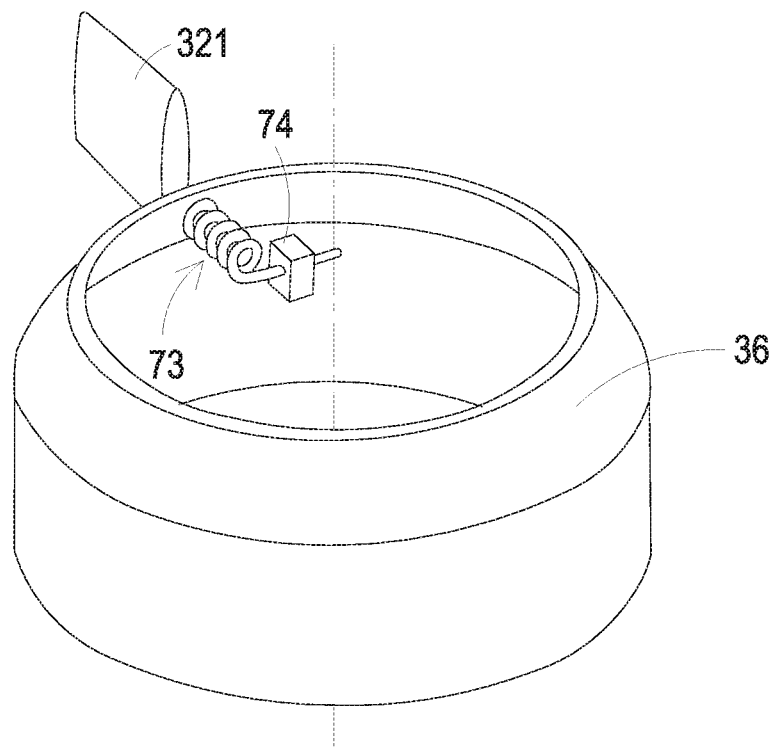
FIG. 7I is a schematic perspective view illustrating a fourth embodiment of an install portion of the Magnus rotor of FIG. 7A.
Figure 7J:
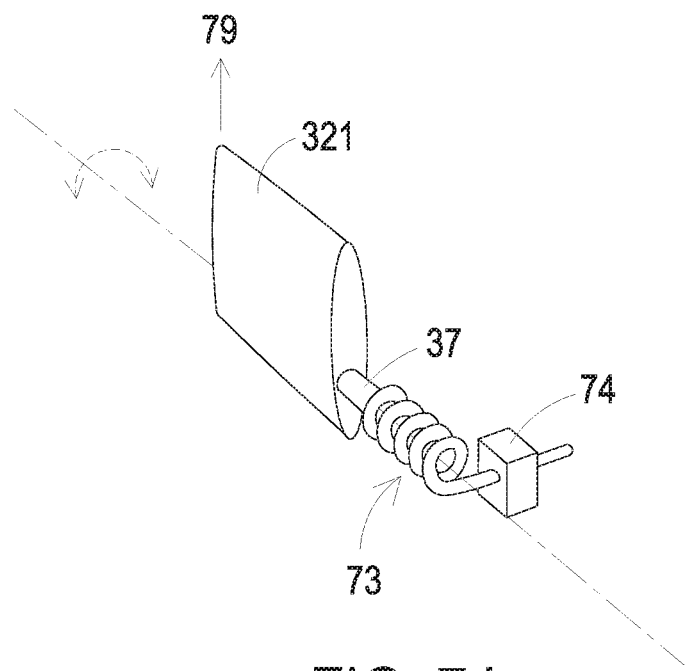
FIG. 7J is a schematic perspective view illustrating a first blade, a connection portion and a connection device of FIG. 7I.

FIG. 7I is a schematic perspective view illustrating a fourth embodiment of an install portion of the Magnus rotor of FIG. 7A. FIG. 7J is a schematic perspective view illustrating a first blade, a connection portion and a connection device of FIG. 7I. As shown in FIGS. 7A, 7J and 7I, in this embodiment, the install portion 35 of the first blade assembly 32 includes a plurality of connection devices. Each connection device includes a third spring 73 and an install portion 74. For showing the connection device clearly, only one connection device is shown. However, it is obvious that the install portion 35 of the first blade assembly 32 includes a plurality of connection devices, and portion of the fixing portion 36 is omitted for allowing the install portion 35 to be shown clearly. The first blade 321 is fixedly connected with the connection portion 37 to form a rigid body structure. One end of the third spring 73 is connected with the corresponding connection portion 37. The other end of the third spring 73 is connected with the install portion 74 fixed on the fixing portion 36. In this embodiment, when the fluid W is stationary and no force is applied to the third spring 73, a chord line 79 of each first blade 321 is parallel to the axis Z. Moreover, when the first blade 321 is inclined by the drag of the fluid W and the first blade 321 is inclined as the dotted line of FIG. 7J, the first blade 321 drives the third spring 73 to rotate via the connection portion 37. Hence, the third spring 73 undergoes deformation to produce recovery force. When the recovery force of the third spring 73 increases until the value balanced with the drag causing by the fluid W acting on the first blade 321, the inclination angle of the first blade 321 is not changed anymore. Moreover, for avoiding the inclination angle of the first blade 321 become too large, the spring with less deformation is employed for the third spring 73. In some embodiments, the fixing portion 36 includes a stopper (not shown in figure) for limiting the inclination angle of the first blade 321. Similarly, the install portion of the second blade assembly 33 includes a plurality of connection devices. The structures and functions of the plurality of the connection devices of the install portion of the second blade assembly 33 are similar to that of the plurality of the connection devices of the install portion 35 of the first blade assembly 32, and are not redundantly described herein.

Referring to FIGS. 7F, 7G and 7H, the operations and functions of the first blade 321 and the second blade 331 of the Magnus rotor 3 of FIGS. 7D, 7E, 7I and 7J are further described as follows. FIG. 7F is a schematic perspective side view illustrating the Magnus rotor of FIGS. 7D and 7I, wherein chord lines of the first blade and the second blade are parallel to the axis when the Magnus rotor is stopped. FIG. 7G is a schematic perspective side view illustrating the Magnus rotor of FIGS. 7D and 7I, wherein chord lines of the first blade and the second blade are inclined with respect to the axis when the Magnus rotor is rotated in clockwise. FIG. 7H is a schematic perspective side view illustrating the Magnus rotor of FIGS. 7D and 7I, wherein chord lines of the first blade and the second blade are inclined with respect to the axis when the Magnus rotor is rotated in counterclockwise. As shown in FIG. 7F, the first blade 321 is divided to a first portion 321a and a second portion 321b with respect to the connection portion 37. The second blade 331 is divided to a first portion 331a and a second portion 331b with respect to the connection portion 37. In this embodiment, the area of the first portion 321a of the first blade 321 is larger than the area of the second portion 321b of the first blade 321. The area of the first portion 331a of the second blade 331 is larger than the area of the second portion 331b of the second blade 331. According to hydrodynamics, the drag of the first blade 321 and the drag of the second blade 331 located in the fluid W is proportional to the area of the respective blade, and also proportional to the square of the speed of the fluid W relative to the respective blade.

As shown in FIG. 7F, when the Magnus rotor 3 is not rotated and the fluid W is stationary, the chord line 79 of the first blade 321 and the chord line 79 of the second blade 331 are parallel to the axis Z. The first portion 321a of the first blade 321 and the first portion 331a of the second blade 331 are located away from the Magnus rotor main body 31. Moreover, as shown in FIG. 7G, when the Magnus rotor 3 is rotated around the axis Z in clockwise, the first blade 321 is pushed by the drag of the fluid W. Since the area of the first portion 321a of the first blade 321 is larger than the area of the second portion 321b of the first blade 321, the drag of the first portion 321a of the first blade 321 is larger than the drag of the second portion 321b of the first blade 321. Consequently, the first blade 321 is inclined in clockwise, as shown in dotted line of FIG. 7G. The leading edge 322 of the first blade 321 is inclined toward the second end 312. The trailing edge 323 of the first blade 321 is inclined away from the second end 312. Therefore, the lift force of the Magnus rotor 3 is increased. Moreover, the second blade 331 is pushed by the drag of the fluid W. Since the area of the first portion 331a of the second blade 331 is larger than the area of the second portion 331b of the second blade 331, the drag of the first portion 331a of the second blade 331 is larger than the drag of the second portion 331b of the second blade 331. Consequently, the second blade 331 is inclined in counterclockwise, as shown in dotted line of FIG. 7G. The leading edge 332 of the second blade 331 is inclined toward the first end 311. The trailing edge 333 of the second blade 331 is inclined away from the first end 311. Therefore, the lift force of the Magnus rotor 3 is increased.

As shown in FIG. 7H, when the Magnus rotor 3 is rotated around the axis Z in counterclockwise, the first blade 321 is pushed by the drag of the fluid W. Since the area of the first portion 321a of the first blade 321 is larger than the area of the second portion 321b of the first blade 321, the drag of the first portion 321a of the first blade 321 is larger than the drag of the second portion 321b of the first blade 321. Consequently, the first blade 321 is inclined in counterclockwise, as shown in dotted line of FIG. 7H. The leading edge 322 of the first blade 321 is inclined toward the second end 312. The trailing edge 323 of the first blade 321 is inclined away from the second end 312. Therefore, the lift force of the Magnus rotor 3 is increased. Moreover, the second blade 331 is pushed by the drag of the fluid W. Since the area of the first portion 331a of the second blade 331 is larger than the area of the second portion 331b of the second blade 331, the drag of the first portion 331a of the second blade 331 is larger than the drag of the second portion 331b of the second blade 331. Consequently, the second blade 331 is inclined in clockwise, as shown in dotted line of FIG. 7H. The leading edge 332 of the second blade 331 is inclined toward the first end 311. The trailing edge 333 of the second blade 331 is inclined away from the first end 311. Therefore, the lift force of the Magnus rotor 3 is increased.

As shown in FIGS. 7F, 7G and 7H, when the Magnus rotor 3 is rotated around the axis Z, the first blade 321 is inclined because the drag of the first portion 321a is not equal to the drag of the second portion 321b, and the second blade 331 is inclined because the drag of the first portion 331a is not equal to the drag of the second portion 331b. However, no matter the rotation direction of the Magnus rotor 3 is in clockwise or counterclockwise, each first blade 321 and each second blade 331 are automatically inclined toward the direction which causes the increasing of the Magnus effect according to this design. Moreover, the Magnus rotor includes a flexible device, for example, spring, rubber or balata. The flexible device is connected with each first blade 321 and each second blade 331 through the connection portion. Consequently, each first blade 321 and each second blade 331 are returned to respective uninclined positions through the recovery force of the flexible device when no drag of the fluid W is applied to each first blade 321 and each second blade 331.

Figure 7K:
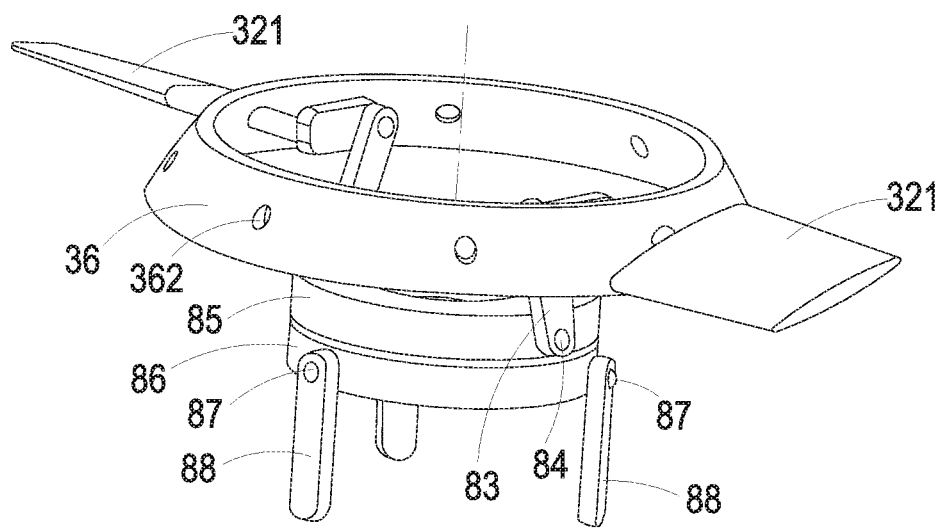
FIG. 7K is a schematic perspective view illustrating a fifth embodiment of an install portion of the Magnus rotor of FIG. 7A.
Figure 7L:
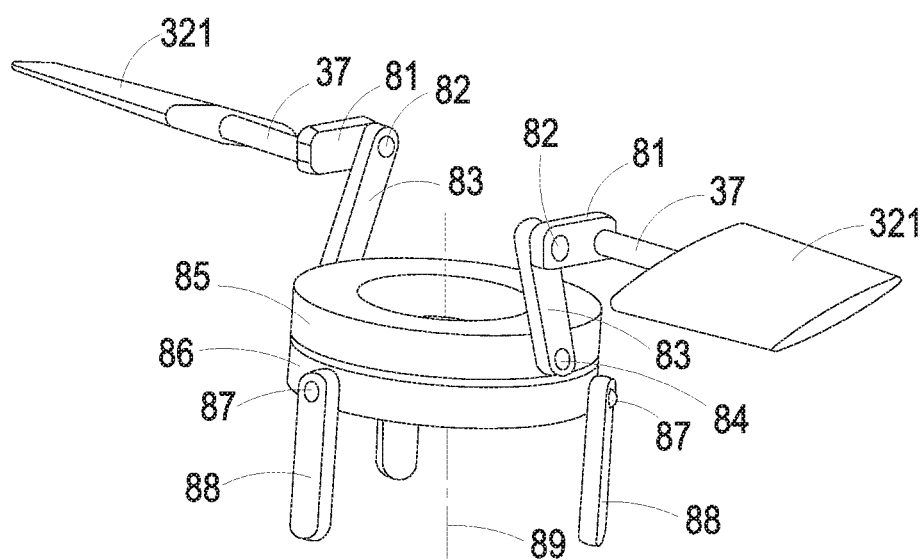
FIG. 7L is a schematic perspective view illustrating a connection device, a slide portion, a carrier, a first bearing and a supporting lever of FIG. 7K.

FIG. 7K is a schematic perspective view illustrating a fifth embodiment of an install portion of the Magnus rotor of FIG. 7A. FIG. 7L is a schematic perspective view illustrating a connection device, a slide portion, a carrier, a first bearing and a supporting lever of FIG. 7K. As shown in FIGS. 7A, 7K and 7L, in this embodiment, the install portion 35 of the first blade assembly 32 includes a plurality of connection devices, a slide portion 85, a carrier 86, a plurality of first bearings 87 and a plurality of supporting levers 88. For showing the connection device clearly, only two sets of the connection devices are shown. However, it is obvious that the install portion 35 of the first blade assembly 32 includes a plurality of connection devices, and portion of the fixing portion 36 is omitted for allowing the install portion 35 to be shown clearly. Each connection device includes a rocker arm 81, a second bearing 82, a link 83 and a third bearing 84. One end of the rocker arm 81 is connected with the first blade 321 through the connection portion 37. The rocker arm 81, the connection portion 37 and the first blade 321 are fixedly connected together and formed as a rigid body structure. The other end of the rocker arm 81 is connected with one end of the link 83 through the second bearing 82. The other end of the link 83 is connected with the slide portion 85 through the third bearing 84. The slide portion 85 and the carrier 86 are formed as a bearing structure. Consequently, the slide portion 85 is rotated around the center axis 89 of the carrier 86, and the carrier 86 is not rotated. One ends of the plurality of supporting levers 88 are connected with the carrier 86 through the plurality of first bearings 87.

While the fixing portion 36 drives the first blade 321 to rotate around the axis Z, the slide portion 85 is rotated accordingly. While the positions of the plurality of supporting levers 88 that are moved in the direction of the axis Z are adjusted, the positions of the slide portion 85 and the carrier 86 that are moved in the direction of the axis Z are thus controlled. While the position of the slide portion 85 that are moved in the direction of the axis Z is adjusted, the second bearing 82 connected between the link 83 and the rocker arm 81 is moved. Moreover, since the connection portion 37 passes through the circular hole 362, the rocker arm 81 is rotated around the axis of the circular hole 362. Consequently, the connection portion 37 is driven to rotate to change the inclination angle of the first blade 321.

In some embodiments, while the heights of the plurality of supporting levers 88 are equal to each other (i.e. the plurality of supporting levels 88 are located at same level), the center axis 89 that the slide portion 85 rotates therearound with respect to the carrier 86 is overlapped with the axis Z of the Magnus rotor main body 31. Consequently, the inclination angles of the plurality of first blades 321 are equal to each other. In other embodiment, while the heights of the plurality of supporting levers 88 are different from each other (i.e. the plurality of supporting levels 88 are located at different levels), the center axis 89 that the slide portion 85 rotates therearound with respect to the carrier 86 is inclined, and the center axis 89 is not overlapped with the axis Z. Consequently, while the first blade 321 is rotated along with the Magnus rotor main body 31 in one turn (i.e. 360 degrees), the inclination angle of the first blade 321 is changed periodically. This will help to control the first blade 321 on the windward side or the leeward side with different inclination angles, consequently, the angle of attack of the first blade 321 can be optimized. The efficiency of the Magnus rotor 3 is more enhanced.

Figure 8:
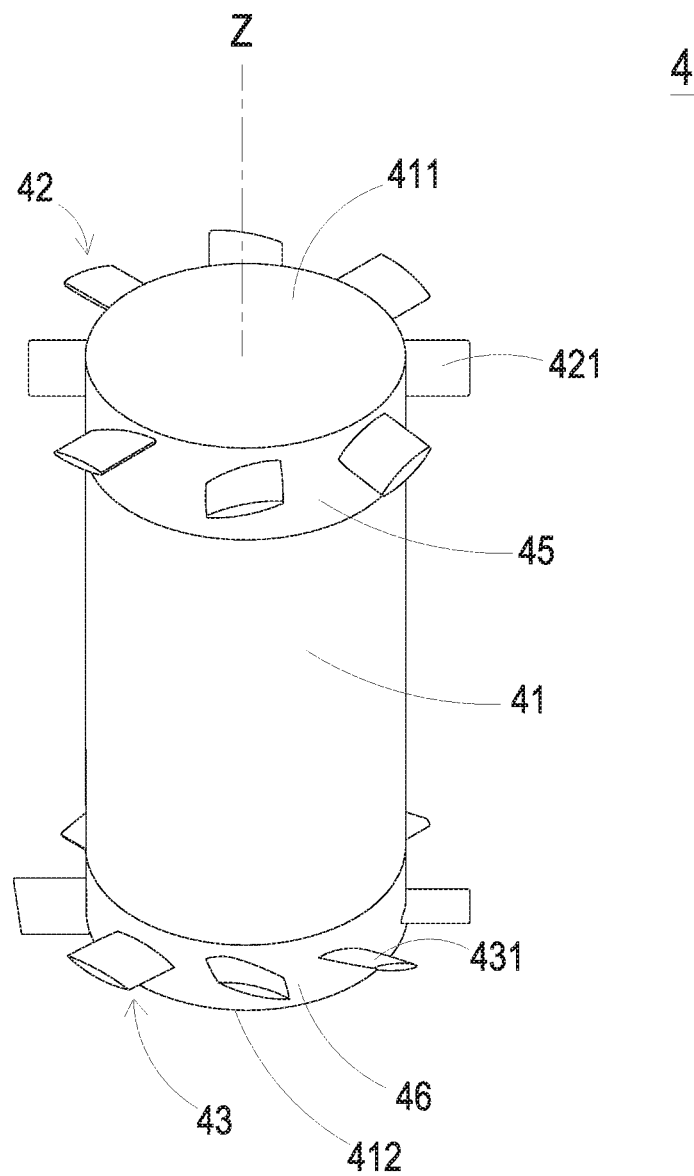
FIG. 8 is a schematic perspective view illustrating a Magnus rotor according to a fourth embodiment of the present disclosure.

FIG. 8 is a schematic perspective view illustrating a Magnus rotor according to a fourth embodiment of the present disclosure. As shown in FIG. 8, the Magnus rotor 4 of this embodiment includes a Magnus rotor main body 41, a first blade assembly 42 and a second blade assembly 43. The structures and functions of the Magnus rotor main body 41, the first blade assembly 42 and the second blade assembly 43 of the Magnus rotor 4 of this embodiment are similar to the Magnus rotor main body 11, the first blade assembly 12 and the second blade assembly 13 of the Magnus rotor 1 of FIG. 2. Component parts and elements corresponding to those of the first embodiment are designated by identical numeral references, and detailed descriptions thereof are omitted. Compared with the first embodiment of FIG. 2, the first end 411 and the second end 412 includes respective install portions 45, 46. The install portion 45 is detachably disposed in the first end 411 of the Magnus rotor main body 41. Consequently, the install portion 45 is rotated independently. The plurality of the first blades 421 are connected to and disposed around the install portion 45 and are spaced apart from each other evenly. Similarly, the install portion 46 is detachably disposed in the second end 412 of the Magnus rotor main body 41. Consequently, the install portion 46 is rotated independently. The plurality of the second blades 431 are connected to and disposed around the install portion 46 and are spaced apart from each other evenly. The install portion 45 includes an independent power source (not shown in the figures), for example, a motor or an engine, for driving the install portion 45 to rotate, and also drives the first blade assembly 42 to rotate around the axis Z. Moreover, the power source of the install portion 45 is different from the power source of the Magnus rotor main body 41. Consequently, the rotation speed and the rotation direction of the first blade assembly 42 can be different from the rotation speed and the rotation direction of the Magnus rotor main body 41. In practice, the rotation direction of the Magnus rotor main body 41 is determined according to the direction of the demanded Magnus lift force. The rotation direction of the first blade assembly 42 is determined according to whether Magnus lift force needs to be increased or decreased. Moreover, the structures and the functions of the install portion 46 connected with the second blade assembly 43 are similar to that of the install portion 45 connected with the first blade assembly 42, and is not redundantly described herein.

From the above descriptions, the Magnus rotor of this disclosure includes a plurality of first blades and a plurality of second blades. The Magnus rotor is driven to rotate by the power source thereof. Consequently, the Magnus rotor produces the Magnus lift force. While the plurality of blades are rotated, the fluid is exhausted from the surface space adjacent to the cylinder side wall so as to increase the Magnus lift force or the fluid is inhaled from exterior of the Magnus rotor to the surface space adjacent to the cylinder side wall so as to reduce the Magnus lift force. So the lift force is easy to control. Moreover, the rotation speed and the rotation direction of the plurality of first blades and the rotation speed and the rotation direction of the plurality of second blades can be different from that of the Magnus rotor main body. The Magnus rotor includes an adjustable mechanism for controlling and adjusting the inclination angles of the blades. Consequently, the Magnus rotor of this disclosure not only increases the lift force of the Magnus effect but the magnitude of the lift force is controllable. The lift-drag ratio of the Magnus rotor is excellent. The efficiency is enhanced. Moreover, all the aforementioned advantages can be achieved by implementing only the first blade assembly. The second blade assembly can be implemented depend on demand.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A Magnus rotor, located in flowing fluid and driven to rotate by a power source, the Magnus rotor comprising:
   a Magnus rotor main body comprising:
      a cylinder side wall;
      a first end disposed in one end of the cylinder side wall and comprising an install portion; and
      a second end disposed in the other end of the cylinder side wall and opposite to the first end, wherein a connection line between a first center point of the first end and a second center point of the second end is formed as an axis, and the Magnus rotor is rotated around the axis; and
   a first blade assembly comprising a plurality of first blades and a plurality of connection portions, wherein the plurality of first blades are disposed around the first end and adjacent to the first end, each first blade is inclined toward a first direction, a first gap is formed between each two adjacent first blades, each first gap is formed as a first flowing channel for allowing the fluid to flow therethrough, wherein each connection portion is connected with the install portion and the corresponding first blade, and the install portion controls each connection portion to change an inclination angle of each first blade.

2. The Magnus rotor according to claim 1, wherein each first blade comprises a leading edge and a trailing edge, the leading edge of the first blade is located on a leading side of the first blade according to a rotation direction of the Magnus rotor, and the trailing edge of the first blade is located on a trailing side of the first blade according to the rotation direction of the Magnus rotor.

3. The Magnus rotor according to claim 2, wherein the leading edge of each first blade is inclined toward the second end with respect to the trailing edge of the corresponding first blade, the trailing edge of each first blade is inclined away from the second end with respect to the leading edge of the corresponding first blade, in order that a lift force resulting from the Magnus rotor is increased.

4. The Magnus rotor according to claim 2, wherein the leading edge of each first blade is inclined away from the second end with respect to the trailing edge of the corresponding first blade, the trailing edge of each first blade is inclined toward the second end with respect to the leading edge of the corresponding first blade, in order that a lift force resulting from the Magnus rotor is reduced.

5. The Magnus rotor according to claim 1, wherein the first blade assembly comprises a fairing, the fairing is disposed on the first end of the Magnus rotor main body for reducing the drag of the first blade assembly.

6. The Magnus rotor according to claim 5, wherein the fairing has an inclined plane for reducing the drag of the fluid.

7. The Magnus rotor according to claim 1, wherein the install portion includes a gear, a gear ring, a motor, a spring, a link, a slide wheel and a bearing.

8. The Magnus rotor according to claim 1, wherein each first blade is divided to a first portion and a second portion with respect to the corresponding connection portion, an area of the first portion is larger than an area of the corresponding second portion, wherein while the Magnus rotor is rotated around the axis, the first blade is inclined causing by that the drag of the first portion is not equal to the drag of the second portion, and each first blade is automatically inclined toward the direction which causes increasing of Magnus effect, wherein the Magnus rotor further comprises a plurality of flexible devices, each flexible device is connected with the corresponding first blade through the connection portion, and each first blade is returned to an uninclined position through a recovery force of the flexible device when no drag of the fluid is applied to each first blade.

9. A Magnus rotor, located in flowing fluid and driven to rotate by a power source, the Magnus rotor comprising:
 a Magnus rotor main body comprising:
  a cylinder side wall;
  a first end disposed in one end of the cylinder side wall; and
  a second end disposed in the other end of the cylinder side wall and opposite to the first end, wherein a connection line between a first center point of the first end and a second center point of the second end is formed as an axis, and the Magnus rotor is rotated around the axis; and a first blade assembly comprising a plurality of first blades, wherein the plurality of first blades are disposed around the first end and adjacent to the first end, each first blade is inclined toward a first direction, a first gap is formed between each two adjacent first blades, each first gap is formed as a first flowing channel for allowing the fluid to flow therethrough, wherein the first end comprises an install portion connected with the first blade assembly, the install portion is rotated independently, the install portion comprises a power source which is independent for driving the install portion to rotate, and a rotation speed and a rotation direction of the first blade assembly rotated around the axis are controlled by the power source of the install portion, wherein the rotation speed and the rotation direction of the first blade assembly rotated around the axis are not related to a rotation speed and a rotation direction of the Magnus rotor main body.

10. A Magnus rotor, located in flowing fluid and driven to rotate by a power source, the Magnus rotor comprising:
 a Magnus rotor main body comprising:
  a cylinder side wall;
  a first end disposed in one end of the cylinder side wall; and
  a second end disposed in the other end of the cylinder side wall and opposite to the first end, wherein a connection line between a first center point of the first end and a second center point of the second end is formed as an axis, and the Magnus rotor is rotated around the axis;
 a first blade assembly comprising a plurality of first blades, wherein the plurality of first blades are disposed around the first end and adjacent to the first end, each first blade is inclined toward a first direction, a first gap is formed between each two adjacent first blades, each first gap is formed as a first flowing channel for allowing the fluid to flow therethrough; and
 a second blade assembly comprising a plurality of second blades, wherein the plurality of second blades are disposed around the second end and adjacent to the second end, each second blade is inclined toward a second direction, a second gap is formed between each two adjacent second blades, and each second gap is formed as a second flowing channel for allowing the fluid to flow therethrough.

11. The Magnus rotor according to claim 10, wherein each second blade comprises a leading edge and a trailing edge, the leading edge of the second blade is located on a leading side of the second blade according to a rotation direction of the Magnus rotor, and the trailing edge of the second blade is located on a trailing side of the second blade according to the rotation direction of the Magnus rotor.

12. The Magnus rotor according to claim 11, wherein the leading edge of each second blade is inclined toward the first end with respect to the trailing edge of the corresponding second blade, the trailing edge of each second blade is inclined away from the first end with respect to the leading edge of the corresponding second blade, in order that a lift force resulting from the Magnus rotor is increased.

13. The Magnus rotor according to claim 11, wherein the leading edge of each second blade is inclined away from the first end with respect to the trailing edge of the corresponding second blade, the trailing edge of each second blade is inclined toward the first end with respect to the leading edge of the corresponding second blade, in order that a lift force resulting from the Magnus rotor is reduced.

14. The Magnus rotor according to claim 10, wherein the second blade assembly comprises a fairing, the fairing is disposed on the second end of the Magnus rotor main body for reducing the drag of the second blade assembly.

15. The Magnus rotor according to claim 14, wherein the fairing has an inclined plane for reducing the drag of the fluid.

16. The Magnus rotor according to claim 10, wherein the second end of the Magnus rotor main body comprises an install portion, the second blade assembly comprises a plurality of connection portions, each connection portion is connected with the install portion and the corresponding second blade, and the install portion controls each connection portion to change an inclination angle of each second blade.

17. The Magnus rotor according to claim 16, wherein the install portion includes a gear, a gear ring, a motor, a spring, a link, a slide wheel and a bearing.

18. The Magnus rotor according to claim 16, wherein each second blade is divided to a first portion and a second portion with respect to the corresponding connection portion, an area of the first portion is larger than an area of the corresponding second portion, wherein while the Magnus rotor is rotated around the axis, the second blade is inclined causing by that the drag of the first portion is not equal to the drag of the second portion, and each second blade is automatically inclined toward the direction which causes increasing of the Magnus effect, wherein the Magnus rotor further comprises a plurality of flexible devices, each flexible device is connected with the corresponding second blade through the connection portion, and each second blade is returned to an uninclined position through a recovery force of the flexible device when no drag of the fluid is applied to each second blade.

19. The Magnus rotor according to claim 10, wherein the second end comprises an install portion connected with the second blade assembly, the install portion is rotated independently, the install portion comprises a power source which is independent for driving the install portion to rotate, and a rotation speed and a rotation direction of the second blade assembly rotated around the axis are controlled by the power source of the install portion, wherein the rotation speed and the rotation direction of the second blade assembly rotated around the axis are not related to a rotation speed and a rotation direction of the Magnus rotor main body.

* * * * *